(No Model.)
T. J. DAVIS.
SUPPORTING WHEEL OR PULLEY.
No. 424,279. Patented Mar. 25, 1890.
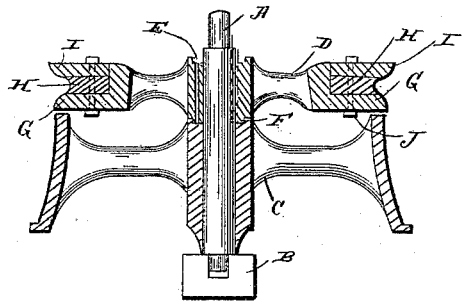
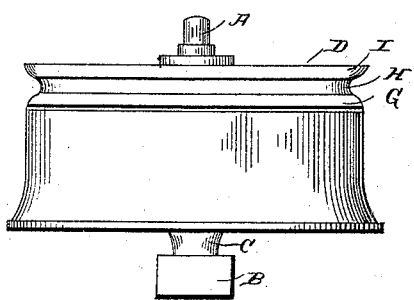
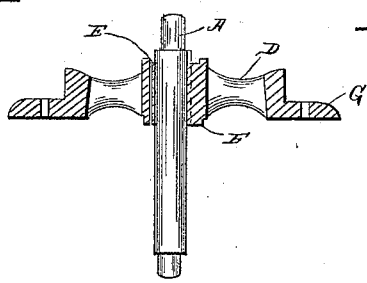
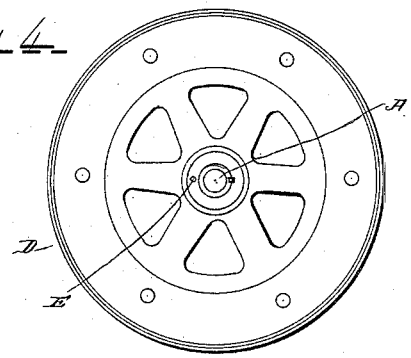
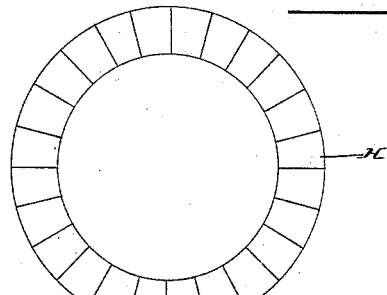
Witnesses
Geo. E. Frech.
Wm. Bagger.
Inventor
Thomas J. Davis,
By his Attorneys,
C. A. Snow & Co.

UNITED STATES PATENT OFFICE.

THOMAS J. DAVIS, OF OMAHA, NEBRASKA.

SUPPORTING WHEEL OR PULLEY.

SPECIFICATION forming part of Letters Patent No. 424,279, dated March 25, 1890.

Application filed May 25, 1889. Serial No. 312,052. (No model.)

*To all whom it may concern:*

Be it known that I, THOMAS J. DAVIS, a citizen of the United States, residing at Omaha, in the county of Douglas and State of Nebraska, have invented a new and useful Supporting Wheel or Pulley, of which the following is a specification.

This invention relates to wheels or pulleys for supporting endless cables, such as are used mainly in connection with cable railroads and for driving various kinds of machinery; and it has for its object to provide a pulley of this class which shall work easily and with the least possible degree of friction, and in which the parts which are most exposed to wear shall be protected, so that they may be conveniently removed and new parts substituted whenever it shall be necessary without the necessity of discharging the entire pulley.

The invention consists in the improved construction, arrangement, and combination of parts, which will be hereinafter fully described, and particularly pointed out in the claims.

In the drawings hereto annexed, Figure 1 is a vertical sectional view of a supporting wheel or pulley embodying my invention. Fig. 2 is a side elevation of the same. Fig. 3 is a sectional detail view of a part of the device. Fig. 4 is a top view of the same. Fig. 5 is a top view of the removable and interchangeable section. Fig. 6 is a sectional view of the same, and Fig. 7 is a top view of the lower supporting-wheel.

The same letters refer to the same parts in all the figures.

A designates a shaft or axle, which is mounted vertically in a suitable box or step B or horizontally in suitable bearings. Journaled loosely upon the shaft A is the supporting wheel or pulley C, which is tapering or conical, as shown, and above or adjacent to the latter and firmly secured upon the shaft A is a wheel or pulley D.

E is a lubricating-channel extending vertically through the hub of the wheel D, and through which lubricating material may be supplied to the bearing of the lower wheel C, the hub of which latter is provided with an annular flange or collar F, encircling the lower end of the hub of the wheel D, so as to form a recess or receptacle in which the lubricating material may be retained.

The rim or flange of the wheel D is provided with an annular shoulder G, forming a seat for the detachable annular bearing-rim H, which is thicker at its inner than at its outer end, and which is retained in position by means of an annular cap-plate I, which is connected with the rim of the wheel D by means of vertical bolts J. The bearing-rim H may be constructed in a single piece or in any desired number of sections, in which latter case the said sections will be retained, owing to the thickened inner end of the said sections, which prevent them from escaping outwardly between the cap-plate I and the rim of the wheel D.

The operation of my invention will be readily understood from the foregoing description, taken in connection with the drawings hereto annexed.

The bearing-rim H, which is the part that is mainly exposed to wear, may at any time be detached and a new one substituted without interfering with the other parts of the device which, not being subject to much wear, will last for a much longer period. The upper wheel D will work easily and with the least possible degree of friction. In case the cable running over the said wheel becomes slack it will slip off and onto the lower tapering or conical wheel. When the cable again becomes tight, it will return to the upper wheel easily and automatically.

Having described my invention, I claim and desire to secure by Letters Patent—

1. In a supporting device for endless cables, the combination of a shaft, a conical wheel mounted loosely on the same and having its hub provided with an annular flange, and the adjacent supporting-wheel having a detachable annular bearing-rim, an annular cap-plate, and a channel extending through its hub and communicating with the hub of the conical wheel within the flange of the latter, substantially as set forth.

2. In a supporting-wheel for endless cables, the combination, with a wheel having a shouldered rim, of an annular bearing-rim composed of one or more sections thicker at their inner than at their outer ends, an annular cap or top plate, and a series of connecting-bolts, substantially as and for the purpose herein set forth.

3. The combination of the vertical shaft, the lower tapering or conical wheel journaled loosely on the same, and a wheel mounted securely upon said axle above said lower wheel, and having a detachable annular bearing-rim and an annular cap or top plate, substantially as and for the purpose set forth.

In testimony that I claim the foregoing as my own I have hereto affixed my signature in presence of two witnesses.

THOMAS J. DAVIS.

Witnesses:
WILLARD W. SLABAUGH,
LOUIS L. BABB.